United States Patent [19]

Konnik

[11] Patent Number: 4,496,795
[45] Date of Patent: Jan. 29, 1985

[54] ELECTRICAL CABLE SPLICING SYSTEM
[75] Inventor: Robert P. Konnik, Seymour, Conn.
[73] Assignee: Harvey Hubbell Incorporated, Orange, Conn.
[21] Appl. No.: 610,785
[22] Filed: May 16, 1984
[51] Int. Cl.³ .................. B32B 15/00; B32B 27/00; H01R 4/00
[52] U.S. Cl. .................. 174/84 R; 156/49; 174/DIG. 8; 428/377; 428/379; 428/383
[58] Field of Search ........... 428/375, 379, 383, 377; 174/84 R, 93, DIG. 8; 156/49

[56] References Cited

U.S. PATENT DOCUMENTS

| 3,691,505 | 9/1972 | Graves | 174/84 R |
|---|---|---|---|
| 4,084,307 | 4/1978 | Schultz et al. | |
| 4,195,106 | 3/1980 | Brusselmans | 174/84 R |
| 4,234,758 | 11/1980 | Guzy | 174/84 R |
| 4,236,949 | 12/1980 | Horsma et al. | |
| 4,273,953 | 6/1981 | Guzy | 174/DIG. 8 |
| 4,370,518 | 1/1983 | Guzy | 174/84 R |

Primary Examiner—Lorraine T. Kendell
Attorney, Agent, or Firm—Jerry M. Presson

[57] ABSTRACT

A splice assembly and method for splicing electrical cables comprises a sealing layer, a barrier and an open mesh sleeve. The sealing layer is formed of uncured insulation material, surrounds the connector coupling exposed adjacent ends of the cable conductors, and engages the insulation layers of the cables: The barrier surrounds the sealing layer for inhibiting flow of the sealing layer upon heating. The open mesh sleeve surrounds the barrier and has its opposite axial ends rigidly secured to the cables. During curing of the sealing layer, the open mesh sleeve applies substantially uniform and constant pressure in a radially inward direction on the sealing layer to avoid air voids and increase the strength of the splice assembly.

18 Claims, 7 Drawing Figures

4,496,795

ELECTRICAL CABLE SPLICING SYSTEM

FIELD OF THE INVENTION

The present invention relates to a splice assembly for insulated electrical cables and to a method of splicing a pair of insulated electrical cables. More particularly, the present invention relates to the use of an open mesh sleeve about uncured insulation material covering the joined cable conductors and applying substantially uniform and constant pressure to the insulation material during the curing process. The radially inwardly directed pressure provided by the open mesh sleeve forms a non-porous splice without the use of complicated multi-part molds.

BACKGROUND OF THE INVENTION

In splicing electrical cables, such as high voltage insulated cables, both the central conductors and the surrounding cylindrical layers of insulation must be joined. The central metallic conductors can be connected in any suitable manner such as by using crimp connectors and butt welding.

A continuous insulation layer is provided over the joined connectors by removing insulation from the ends of the conductors before joining, and then placing a layer of uncured insulation material over the joined connectors. The uncured insulation is subsequently cured under heat and pressure allowing the uncured insulation material to cure and fuse with the adjacent insulation remaining on the cables.

The curing operation is critical since improper curing will result in a defective splice. Defective splices will not have a uniform layer of cured insulation surrounding the joined conductors and will include air voids or pores.

Electrical cables used in oil wells to power pumps located many feet below the surface must be capable of performing satisfactorily under extreme adverse conditions of heat, mechanical stress and pressure. Such cables experience down-hole pressures which can be in the hundreds of thousands of pounds per square inch. Any voids or air pockets existing in the insulation receive gas forced into them at high pressures over a period of time. When the head of well fluid is pumped down rapidly or when the cable is relatively quickly extracted from the well, insufficient time is provided for the gas trapped in the voids to bleed off. As a result, the insulation on the cable tends to expand like balloons and can rupture, rendering the cable useless.

Conventional systems for producing an insulated splice between two cables suffer from numerous disadvantages. The apparatus are complex and expensive, and are difficult to use, particularly in the field. Additionally, the conventional apparatus often do not maintain an adequately constant pressure during the curing operation to avoid the formation of air voids in the splice insulation.

Examples of such conventional devices are disclosed in U.S. Pat. No. 4,084,307 to Schultz et al and U.S. Pat. No. 4,236,949 to Horsma et al.

Another mold device for forming a splice between electrical cables by applying heat and pressure is disclosed in U.S. patent application Ser. No. 404,152, entitled "Apparatus and Method for Producing an Insulated Connection Between Electrical Cables", of Neuroth et al, the subject matter of which is hereby incorporated by reference.

SUMMARY OF THE INVENTION

An object of the present invention is to provide a splice assembly and a method of splicing electrical cables providing a homogeneous insulation layer without air voids and with a uniform diameter and concentricity.

Another object of the present invention is to provide a splice assembly and method for splicing electrical cables which can be simply, reliably and quickly performed in the field, without complex molding apparatus.

A further object of the present invention is to provide a splicing assembly and a method for splicing electrical cables which applies substantially constant and uniform pressure to the curing insulation during both heating and cooling.

The foregoing objects are basically obtained by providing a splice assembly for insulated electrical cables comprising first and second cables, a connector, a sealing layer, a barrier and an open mesh sleeve. Each of the cables has an insulation layer surrounding a conductor, with the conductor having an exposed end extending from its insulation layer. The connector electrically couples the exposed conductor ends. The sealing layer is formed of uncured insulation material and surrounds the connector and engages the insulation layers of the cables. The barrier surrounds the sealing layer for inhibiting flow of the insulation layer upon heating. The open mesh sleeve surrounds the barrier and has opposite axial ends rigidly secured to the first and second cables.

Upon heating, the sealing layer seals the connected ends, while the open mesh sleeve applies substantially uniform and constant pressure to the sealing layer between its axial ends during the curing process.

The foregoing objects are also basically attained by providing a method of splicing a pair of electrical cables, each cable having an insulation layer surrounding a conductor. After a portion of the insulation layer adjacent an end of each cable is removed, the conductor ends are electrically connected. Uncured insulation is wrapped about the insulation layers and the connected conductors. A barrier layer is wrapped about the uncured insulation layer. Subsequently, an open mesh sleeve is mounted over the barrier layer with the axial ends of the open mesh sleeve fixedly secured to the cables. During heating and the subsequent cooling of the adjacent cable ends to cure the uncured insulation material, the open mesh sleeve applies substantially uniform and constant pressure directed radially inwardly on the insulation material.

In the preferred embodiment of both the splice assembly and the splicing method, the open mesh sleeve is a braid.

By forming the splice assembly and performing the method in this manner, the splice assembly can be formed without an external mold, by merely placing the splice in a portable oven. The open mesh sleeve provides the pressure necessary to properly cure the sealing layer, in addition to increasing the strength of the formed splice. The pressure generated by expansion of the insulation layer against the open mesh sleeve during the curing process eliminates the formation of air voids or pores within the splice insulation. Since the open mesh sleeve is flexible and non-rigid, it can be easily conformed to the varying diameters and irregularities of the splice, providing uniform pressure and maintaining the sealing layer concentrically about the joint conductors.

Other objects, advantages, and salient features of the present invention will become apparent from the following detailed description which, taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF PREFERRED EMBODIMENTS OF THE INVENTION

Figure 1:
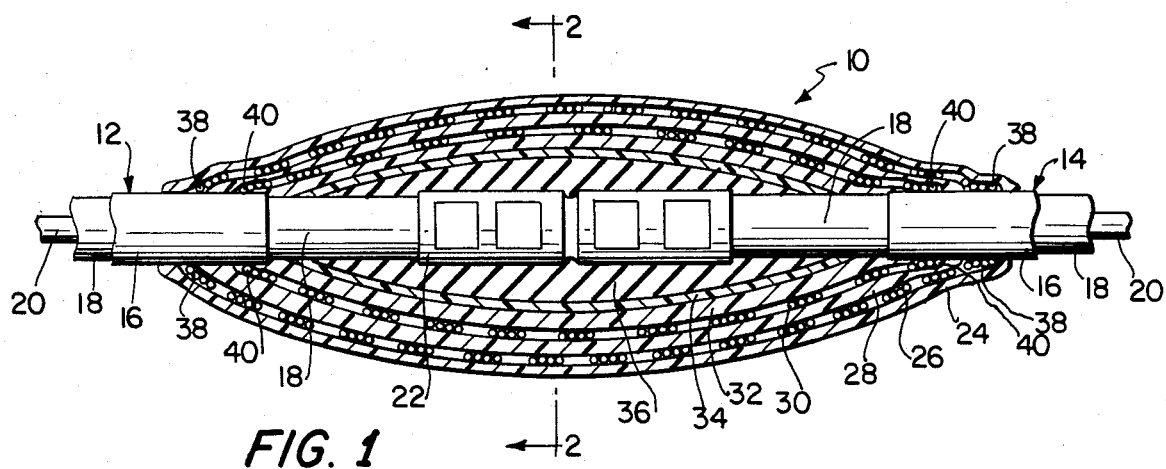
FIG. 1 is a side elevational view in section of a splice assembly according to a first embodiment of the present invention.
Figure 2:
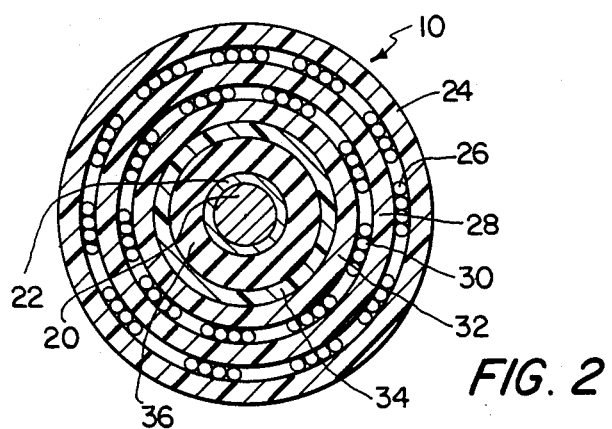
FIG. 2 is a front elevational view in section taken along lines 2—2 of FIG. 1.
Figure 3:
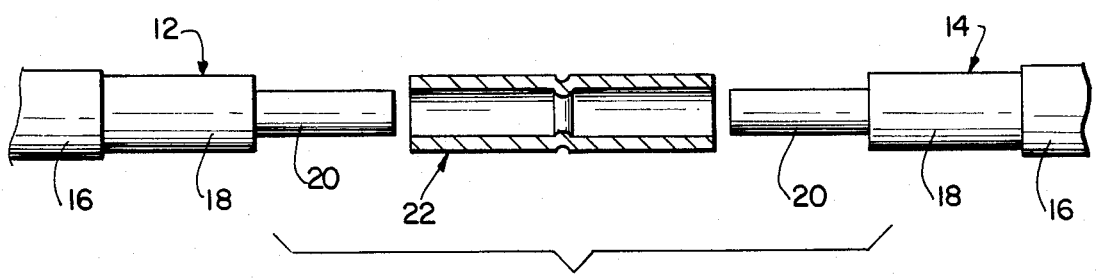
FIG. 3 is an exploded, side elevational view, partially in section, of two cables and a connector.

Referring initially to FIGS. 1-3, the splice assembly 10 in accordance with the present invention is formed with two insulated electrical cables 12 and 14. Each cable comprises, from outside in, an outer jacket 16 of braid or tape, an insulation layer 18 and a central metallic conductor 20. The splice between the two cables is formed by at least a sealing layer of electrically insulating material, a barrier layer and an open mesh sleeve.

In the first embodiment illustrated in FIGS. 1 and 2, splice assembly 10 comprises a plurality of layers surrounding joined conductors 20. The conductors are connected by a suitable connector 22 which can comprise a crimp sleeve. Any suitable type of electrical and mechanical coupling between the conductors can be employed, including butt welding.

Viewed from outside in, the various layers forming the splice assembly comprise an outer layer of teflon tape 24, an outer open mesh sleeve 26 in the form of a braid, a middle teflon tape layer 28, an inner open mesh sleeve 30 in the form of a braid, a chemical barrier layer 32, and inner teflon tape layer 34 and a sealing layer 36 of uncured insulation material.

Sealing layer 36 comprises unvulcanized thermosetting rubber which is applied about cable insulation layers 18 and connectors 22 in the form of tape wrapped in an overlapping manner. Upon heating and subsequent cooling, the uncured insulation material forms a homogeneous layer which is cured and bonded to insulation layers 18 of the electrical cables completely sealing the joint.

The unvulcanized material must be subjected to both heat and pressure during the curing process. In the splice assembly of the present invention, the required radially inwardly directed pressure is provided by open mesh sleeves 26 and 30. Mesh sleeves 26 and 30 have axial ends 38 and 40, respectively, which are secured to the outermost layer 16 of cables 12 and 14. Each sleeve is preferably a braid formed of Tefzel, PEEK, Kynar, nylon or other high temperature thermoplastic materials. To further enhance the pressure applied during the heating portion of the curing process, the open mesh sleeves are preferably heat shrinkable to increase the radially inward pressure. The sleeves can also be a wire mesh braid of corrosion resistant metal. The metal wire mesh can be tinned copper wire, Monel or stainless steel. Additionally, the sleeves can be formed of combinations of these materials.

Inner teflon layer 34 forms a barrier layer to control the flow of the uncured insulation material when it is heated during the curing process. In this manner, the barrier formed by layer 34 forms a closed bladder that prevents the insulation material from pushing outwardly, particularly through the open mesh sleeves. Additionally, inner teflon layer 34 separates the semiconductive chemical barrier layer 32 from the insulation material. Mixing of the chemical barrier with the insulation material can adversely affect the splice.

The middle and outer teflon layers 28 and 24 compress the braided sleeves as the teflon tape is applied to make the sleeves conform to the irregular shape of the splice, protect the splice assembly from environmental conditions and further control of the flow of the insulation material of layer 36. Any suitable material can be used for forming the barrier as long as it restricts the radially outward flow of the insulation material. Such barrier can be totally impermeable or somewhat permeable. For example, the barrier can be formed of a finely woven nylon fabric sleeve which will greatly inhibit the flow of the insulation material.

Chemical barrier layer 32 is formed of a suitable submersible pump jacket material included as part of the covering for the electrical cables. This layer makes the splice assembly capable of withstanding the same chemical environments, without failure, as the connected cables.

Figure 4:
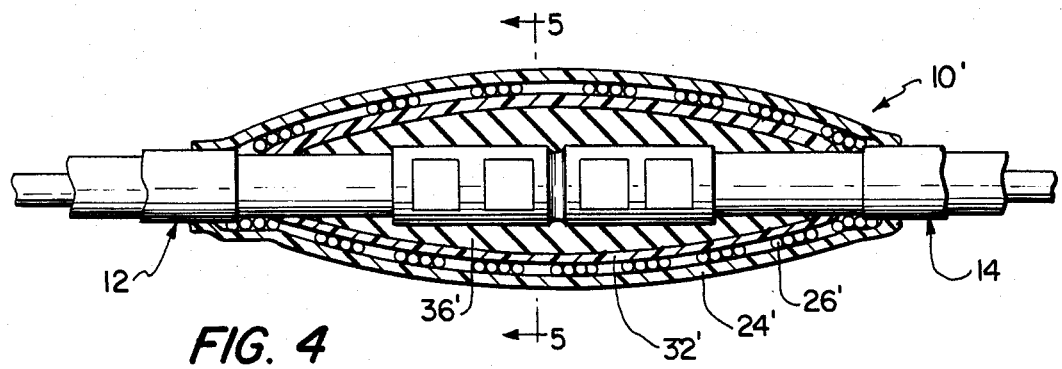
FIG. 4 is a side elevational view in section of a splice assembly according to a second embodiment of the present invention.
Figure 5:
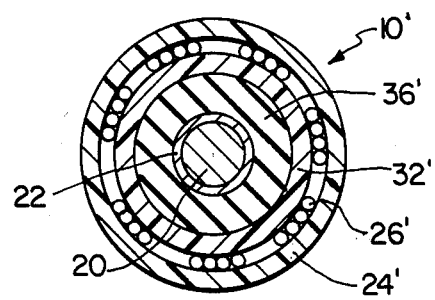
FIG. 5 is a front elevational view in section taken along lines 5—5 of FIG. 4.

FIGS. 4 and 5 illustrate a second embodiment of the present invention wherein electrical cables 12 and 14 are coupled by a splice assembly 10'. Each of the various layers of splice assembly 10' is denoted with the reference numeral for the corresponding layer in the first embodiment of FIGS. 1-3, but with the addition of a prime.

In the second embodiment, the various layers, from outside in, comprise an outer teflon tape layer 24', a single open mesh sleeve 26' and a chemical barrier layer 32'. Layer 32' surrounds sealing layer 36' and forms both a chemical barrier and a barrier layer for inhibiting the outward flow of the uncured insulation material forming layer 36'. Submersible pump jacket material having an outer covering of a finely woven nylon fabric mesh can be used for layer 32'. Thus, the embodiment of FIG. 2 is similar to that of FIG. 1, except that the second embodiment does not include the inner and middle teflon tape layers and the inner open mesh sleeve.

Figure 6:
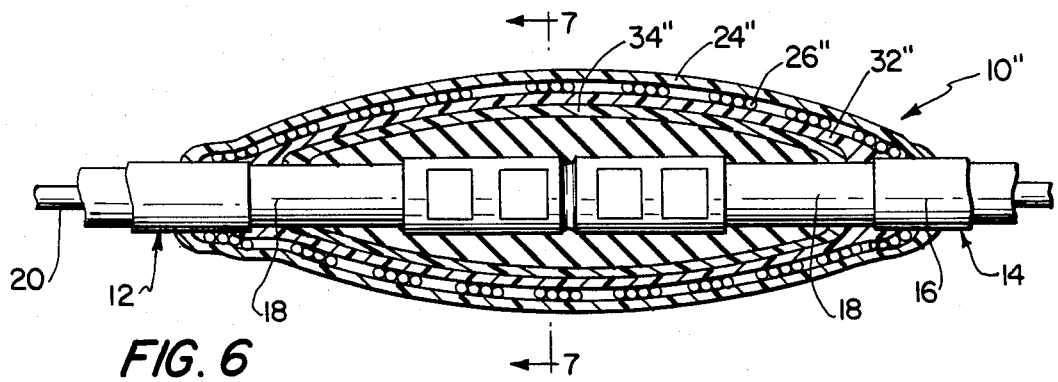
FIG. 6 is a side elevational view in section of a splice assembly according to a third embodiment of the present invention.
Figure 7:
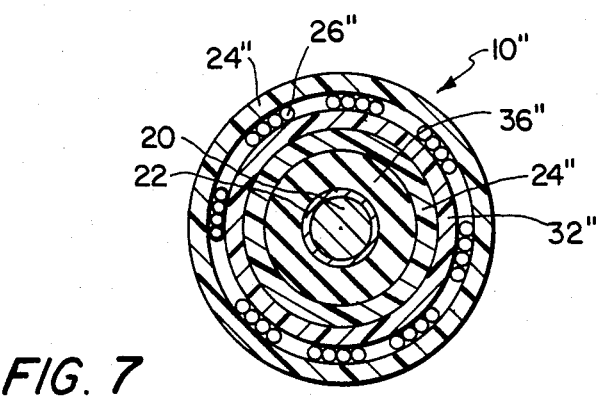
FIG. 7 is a front elevational view in section taken along lines 7—7 of FIG. 6.

A third embodiment of the present invention is illustrated in FIGS. 6 and 7. The third embodiment differs from the first embodiment in that the third embodiment does not include the inner open mesh sleeve and the middle layer of teflon tape of the first embodiment. The features of the third embodiment which are similar to those of the first embodiment are denoted with like reference numerals, but with the addition of a double prime.

In the third embodiment, the various layers comprise, from outside in, an outer layer of teflon tape 24", an open mesh sleeve 26", a chemical barrier layer 32", an inner teflon tape layer 24", and a sealing layer 36". The various layers are the same as the corresponding layers of the first embodiment.

For each embodiment, the cables are prepared for the splice assembly by removing portions of the outer jacket 16 (including armor covering and steel struts and lead decomposition cushions) and insulation layers 18 from the adjacent ends of cables 12 and 14 to be joined. If a plurality of cables housed in a single armor covering are to be joined, the various splices should be axially staggered. This removal process exposes ends of conductors 20 and adjacent portions of insulation layers 18. The conductors are mechanically and electrically coupled in any suitable conventional manner. In the illustrated embodiment, conductors 20 are inserted within a metallic crimp sleeve 22, as illustrated in FIG. 3, and then crimped on the outer surface of the sleeve. Heat shrink tubing can be provided over the chemical barrier tape remaining on the cables such that only an end portion of the chemical barrier tape is exposed.

Depending on the particular form of the invention used, the various layers are then provided about the connected cables. To facilitate the description, the method in connection with the first embodiment of FIGS. 1 and 2 will be described in detail. The method in connection with the remaining embodiments is similar, with the exceptions noted above with respect to the omitted layers.

Sealing layer 36 is formed by wrapping the uncured insulation material in tape form about the exposed portions of insulation layers 18 and connector 22. Chemical barrier layer 32, as well as the three teflon layers 24, 28 and 34, are also formed by wrapping the appropriate materials provided in tape form in an overlapping manner. To improve attachment the exposed portions of the cables and the connector can be lightly abraded, and the connector can be lightly coated with epoxy. Inner teflon layer 34 can leave the axial ends of insulation layer 36 exposed. Epoxy can be used to secure various tape layers in place. Reversing the direction of applying adjacent layers of tape will improve the taping operation.

The open mesh sleeves 26 and 30 are placed over the appropriate layers with their ends 38 and 40 rigidly secured to the outer jacket of cables 12 and 14, e.g., by an epoxy adhesive or cement. In mounting sleeves 26 and 30 over the layers enclosed therein, the sleeves are extended longitudinally during wrapping of the tapes forming teflon layers 24 and 28 such that each sleeve conforms tightly to the varying diameters and irregularities of such inner layers. Excess sleeve length can be removed. Initially, the sleeves are loosely mounted on the cables before any connection is made, and are then slid into position at the appropriate time.

The splice assembly is positioned within a portable oven, and then heated (typically at 300° F. for 1.5 hours) and cooled according to conventional practices for curing sealing layer 36 about the connected conductors. Since the required radial pressure is provided by the sleeves during the cooling process, the curing process can be conducted in the absence of an expensive and complex multiple part molding apparatus. After the curing process, the splice assembly can be suitably covered, e.g., with glass tape between and over parallel cables and with an armor covering secured to the armor coverings on the spliced cables.

The combination of the barrier layer and the surrounding open mesh sleeve form a bladder which contains the curing insulation material during the curing process. This bladder provides substantially equal and constant pressures in all directions throughout the curing process, while maintaining the flexibility of the splice assembly. Upon completion of the curing process, the resulting splice assembly is flexible in the same manner as the connected cables, without having to remove molding devices.

The braid material of the open mesh sleeve can shrink as it is heated. The heat shrinkable mesh sleeve increases the pressure applied to the sealing layer over that produced merely by the expanding insulation material as the material cures. When the filaments of the sleeve shrink with increasing temperature, the filaments can store additional strain energy that is applied to the sealing layer during the cooling portion of the curing process. In this manner, high and uniform pressure is applied during the cooling cycle, as well as during the heating cycle.

Since the open mesh sleeve provides radial pressure in all directions about the sealing layer, the forces are equally and evenly distributed along the sealing layer. Such distribution of forces prevents the sealing layer from shifting radially such that it is maintained concentrically about the conductors.

The open mesh sleeve extends axially beyond sealing layer 36 and is directly coupled to the cable tapes or braids. The properties of the open mesh sleeve cause it to remain centered about the conductors across the entire splice assembly and onto the insulated cables at the opposite ends of the splice assembly. The centering is particularly facilitated by making the length and tension on each filament of the open mesh sleeve equal across the entire splice region.

The placement of the chemical barrier under an open mesh sleeve is preferred. By placing the open mesh sleeve radially outwardly of the chemical barrier, the open mesh sleeve ensures that a void-free interface will be provided between the chemical barrier and the insulation throughout the entire transition region of the splice assembly between the cables.

The teflon tape is used as a barrier since it has sufficient physical strength at the elevated temperatures of the curing process so as to prevent the sealing layer material from flowing through the open mesh sleeve. Containment of the sealing layer material ensures that adequate pressure will be generated during vulcanization and provides restraint during decompression. However, other barrier materials serving this function can be employed in place of the teflon tape.

The use of a plurality of open mesh sleeves in the first embodiment provides a splice assembly having a laminar construction. The laminar construction further improves the splice assembly.

While advantageous embodiments have been chosen to illustrate the invention, it will be understood by those skilled in the art that various changes and modifications can be made therein without departing from the scope of the invention as defined in the appended claims.

What is claimed is:

1. A splice assembly for insulated electrical cables, comprising:

a first cable having a first insulation layer surrounding a first conductor, said first conductor having a first exposed end extending from said first layer;

a second cable having a second insulation layer surrounding a second conductor, said second conductor having a second exposed end extending from said second layer;

connector means for electrically coupling said first and second exposed conductor ends;

a sealing layer of uncured insulation material surrounding said connector means and engaging said insulation layers;

barrier means, surrounding said sealing layer, for inhibiting flow of said sealing layer upon heating; and an open mesh sleeve surrounding said barrier means having opposite axial ends rigidly secured to said first and second cables;

whereby, upon heating, said sealing layer seals the connected ends with said open mesh sleeve applying substantially uniform and constant pressure to said sealing layer between said axial ends during curing.

2. A splice assembly according to claim 1 wherein said uncured insulation material is unvulcanized thermosetting rubber.

3. A splice assembly according to claim 1 wherein said sealing layer comprises tape wrapped around said connector means.

4. A splice assembly according to claim 1 wherein said open mesh sleeve is shrinkable upon heating.

5. A splice assembly according to claim 1 wherein said barrier means comprises teflon tape.

6. A splice assembly according to claim 1 wherein a chemical barrier layer is interposed between said barrier means and said open mesh sleeve for making the splice assembly resistant to chemical environments.

7. A splice assembly according to claim 1 wherein said barrier means comprises a woven nylon fabric.

8. A splice assembly according to claim 1 wherein said open mesh sleeve is surrounded by teflon tape.

9. A splice assembly according to claim 1 wherein said open mesh sleeve comprises a wire mesh.

10. A splice assembly according to claim 9 wherein said wire mesh is formed from the group consisting of tinned copper wire, Monel wire and stainless steel wire.

11. A splice assembly according to claim 1 wherein said open mesh sleeve comprises a braid.

12. A method of splicing a pair of electrical cables, each cable having an insulation layer surrounding a conductor, comprising the steps of:

removing a portion of the insulation layer adjacent an end of each electrical cable;

electrically connecting the ends of the conductors of the electrical cables;

wrapping uncured insulation material about the insulation layers and the connected conductors;

wrapping a barrier layer about the uncured insulation layer;

mounting an open mesh sleeve over the barrier layer and securing opposite axial ends of the open mesh sleeve to the cables; and heating and then cooling the adjacent cable ends to cure the uncured insulation material while the open mesh sleeve applies substantially uniform and constant pressure directed radially inwardly on the insulation material during curing.

13. A method according to claim 12 wherein said insulation material is unvulcanized thermosetting rubber.

14. A method according to claim 12 wherein the insulation material wrapping step comprises wrapping insulation material in tape form about the insulation layers and connected conductors.

15. A method according to claim 12 wherein the heating step comprises heating the cable ends in an oven.

16. A method according to claim 15 wherein the heating and cooling steps take place in absence of rigid mold parts.

17. A method according to claim 12 wherein the barrier layer wrapping step comprises wrapping barrier material in tape form about the insulation material.

18. A method according to claim 12 wherein the open mesh sleeve is braided.

* * * * *